Feb. 23, 1960
A. R. CAMMACK
2,925,731
WEIGHT INDICATOR
Filed April 16, 1957
2 Sheets-Sheet 1
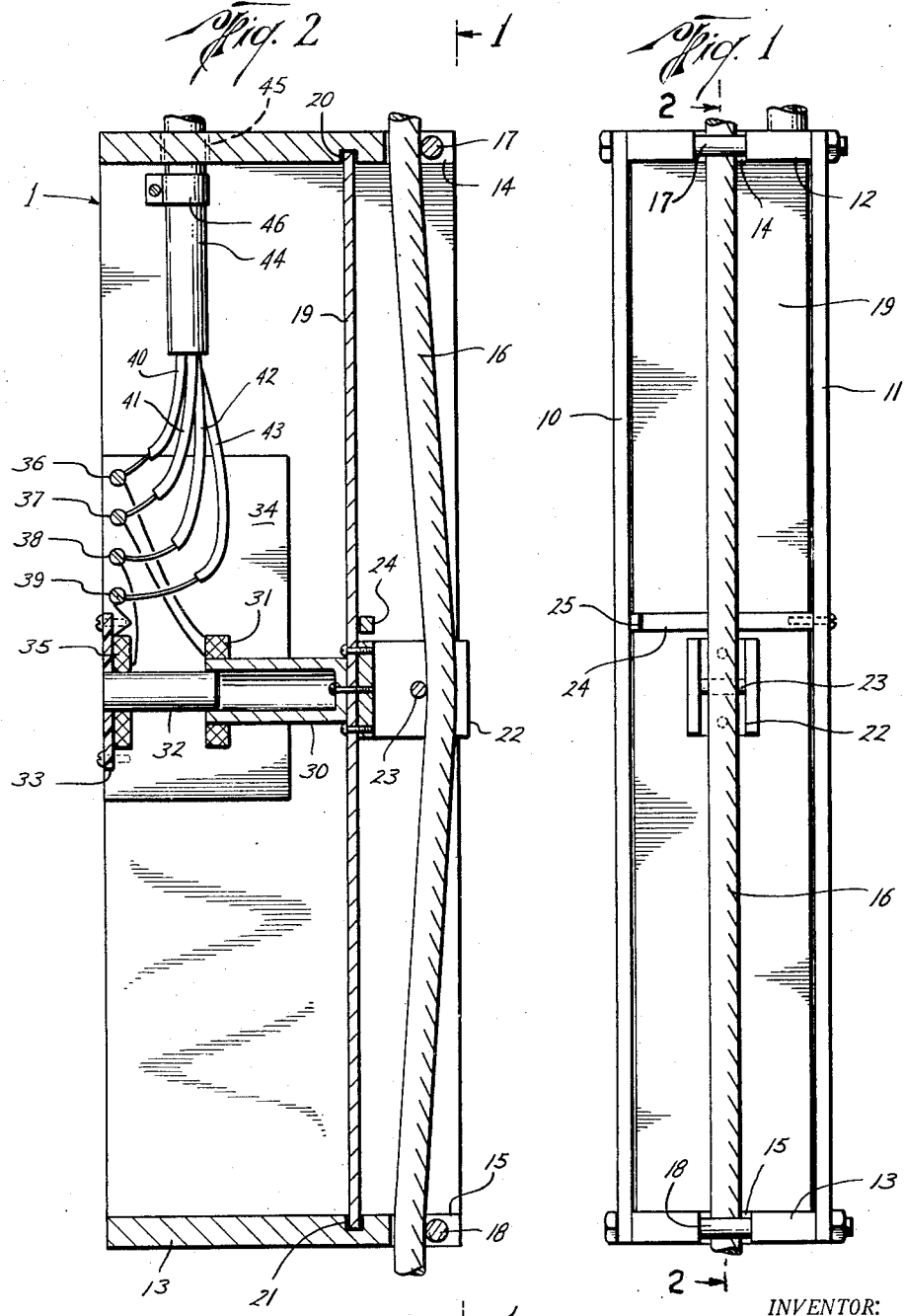
INVENTOR:
ARTHUR R. CAMMACK
BY Murray Robinson
ATTORNEY Feb. 23, 1960   A. R. CAMMACK   2,925,731
WEIGHT INDICATOR
Filed April 16, 1957   2 Sheets-Sheet 2
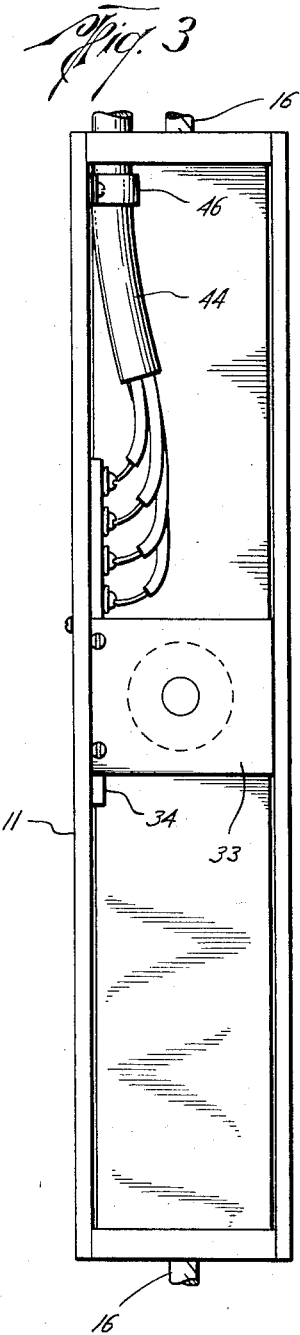
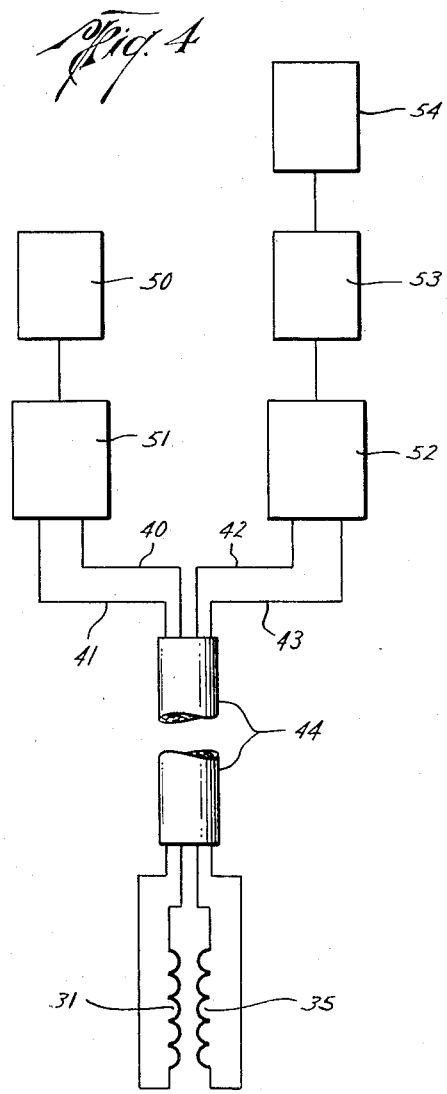
Arthur R. Cammack
INVENTOR.
BY Murray Robinson
ATTORNEY

United States Patent Office 2,925,731
Patented Feb. 23, 1960

2,925,731
WEIGHT INDICATOR

Arthur R. Cammack, Houston, Tex., assignor to Associated Engineering & Equipment Company, Houston, Tex., a corporation of Texas Application April 16, 1957, Serial No. 653,232

1 Claim. (Cl. 73—144)

This invention pertains to line tension indicators such as may be used, for example, in a towing cable or wire line run into a well, and more particularly to such a device known as a weight indicator for measuring the tension in a cable used to support a string of drill pipe used in rotary drilling for oil, from which measurement the weight on drill bit at the end of the drill string can be determined.

An object of the invention is to provide such a device having an indicator which can be placed at any desired point without regard to the location of the cable, including a point remote from the cable if desired.

Another object of the invention is to provide such a device which will give an indication on a linear scale or in which there will not be overcrowding of the scale markings at one end.

A further object of the invention is to provide such a device which is light in weight, simple and inexpensive to manufacture, reliable in operation, and easy and inexpensive to maintain.

Other objects and advantages of the invention will appear from the following description of a preferred embodiment thereof wherein:

Figure 1 is a front elevation;
Figure 2 is a section on line 2—2 of Figure 1;
Figure 3 is a rear elevation; and
Figure 4 is a schematic wiring diagram.

Referring to Figure 1, there is shown a transducer comprising a rectangular housing including side plates 10, 11 and upper and lower end blocks 12, 13 secured thereto. Slots 14, 15 in the end blocks are adapted to receive a cable 16 (see Figure 2). Removable pins 17, 18 retain the cable in the slots. An elastic bar or elongated plate 19 is held at its ends in recesses 20, 21 in blocks 12, 13 and carries a fulcrum block 22 secured to its middle portion. Block 22 is slotted to receive cable 16 which rests against a pin 23 extending across the slot. A spacer bar 24 and shim 25 secured to side plates 10, 11, insure that bar 19 is free to move therebetween as it flexes due to the reaction of cable 16 against pin 23 when the cable is in tension.

To the rear of bar 19 is secured a plastic cup 30 carrying an electric coil 31 at one end thereof. Cup 30 and coil 31 are concentrically disposed at the end of a cylindrical magnetic core 32 of ferrite or similar high permeability material which is mounted at its other end in a plate 33 made of a non-magnetic and electrically insulating material. Plate 33 is secured to the edge of a terminal board 34 (see also Figure 3) which in turn is fastened to side plate 11. Another electric coil 35 is fixedly mounted on core 32 adjacent plate 33. The two ends of coil 31 and the two ends of coil 35 are connected to posts 36, 37, 38, 39, which are also connected to the ends of four wires 40, 41, 42, 43 in cable 44. Cable 44 leaves the housing through aperture 45 in end block 12 and is prevented from pulling loose by clamp 46.

Referring to Figure 4, wires 40, 41 are supplied with alternating current of a desirable frequency from oscillator 50 through amplifier 51. Wires 42, 43 feed into non-linear amplifier 52 whose output is connected to rectifier 53 which in turn feeds electric meter 54.

As the tension of cable 16 varies, the deflection of bar 19 varies. The stiffness of bar 19 is selected so that the deflections are not large whereby the bar deflection will approach being a linear function of the cable tension. The coupling of coils 31, 35 follows an approximately inverse square law and this non-linearity plus any non-linearity in the cable tension versus bar deflection function are compensated for by non-linear amplifier 52 which is approximately a square law amplifier and may be of any suitable type. Or if desired or necessary compensation can be achieved by shaping the core 32, e.g. instead of a cylindrical shape it would have a shape whose cross-sectional area varied with the length. Such a non-linear core can be used as the sole compensation or can be used in conjunction with a non-linear amplifier. The result is that the deflections of meter 54 are substantially a linear function of the cable tension so that an approximate to a linear scale can be used in the meter.

The weight indicator according to the invention thus comprises the transducer shown in Figures 1–3 which is very rugged and adapted to the rough handling it is apt to receive, for example, when installed on the dead line of a drill rig cable, plus the other associated electrical apparatus shown in Figure 4 which can be mounted in a suitable protective housing so as to also be able to withstand rough treatment. The receiver or meter 54 can be located at any point where it is conveniently visible to the driller or other personnel.

While a preferred embodiment of the invention has been shown and described, many modifications thereof can be made by one skilled in the art without departing from the spirit of the invention and it is desired to protect by Letters Patent all forms of the invention falling within the scope of the following claim.

I claim:

A line tension indicator comprising an elongated housing, an elongated elastic bar supported at its ends in the ends of said housing for free flexing movement, spaced cable retaining portions at the ends of said housing through which a cable is adapted to pass, a fulcrum secured to said bar between the ends thereof over which fulcrum said cable is adapted to pass to cause deflection of the bar varying according to the cable tension, an elongated magnetically permeable core carried by said housing, a coil carried by said housing mounted near one end of said core, a coil carried by said bar concentrically disposed at the other end of said core and near the first coil, and means responsive to the variation in the coupling of said coils as said bar flexes and moves said coils closer or farther apart to give an indication of the tension in said cable, said means comprising a source of alternating current connected to one of said coils and a square law alternating current amplifier connected to the other coil and feeding an electric indication means.

References Cited in the file of this patent

UNITED STATES PATENTS

| | | |
|---|---|---|
| 1,560,951 | Thompson et al. | Nov. 10, 1925 |
| 1,610,179 | Thompson | Dec. 7, 1926 |
| 1,684,746 | Smith et al. | Sept. 18, 1928 |
| 1,872,087 | Martin | Aug. 16, 1932 |
| 2,035,439 | Crossley | Mar. 24, 1936 |
| 2,111,373 | Schaper | Mar. 15, 1938 |
| 2,427,872 | Newman | Sept. 23, 1947 |
| 2,452,302 | Hitchen | Oct. 26, 1948 |
| 2,528,883 | Hayward | Nov. 7, 1950 |
| 2,619,552 | Kerns | Nov. 25, 1952 |
| 2,686,893 | Markson | Aug. 17, 1954 |
| 2,736,861 | Duffy et al. | Feb. 28, 1956 |
| 2,744,168 | Gilbert | May 1, 1956 |
| 2,785,356 | Nisle | Mar. 12, 1957 |

FOREIGN PATENTS

| | | |
|---|---|---|
| 1,081,718 | France | June 9, 1954 |